May 26, 1936.  LE ROI E. HUTCHINGS  2,042,005
CAMERA FOR DUPLICATING RECORD CARDS
Filed Sept. 9, 1933  3 Sheets-Sheet 1
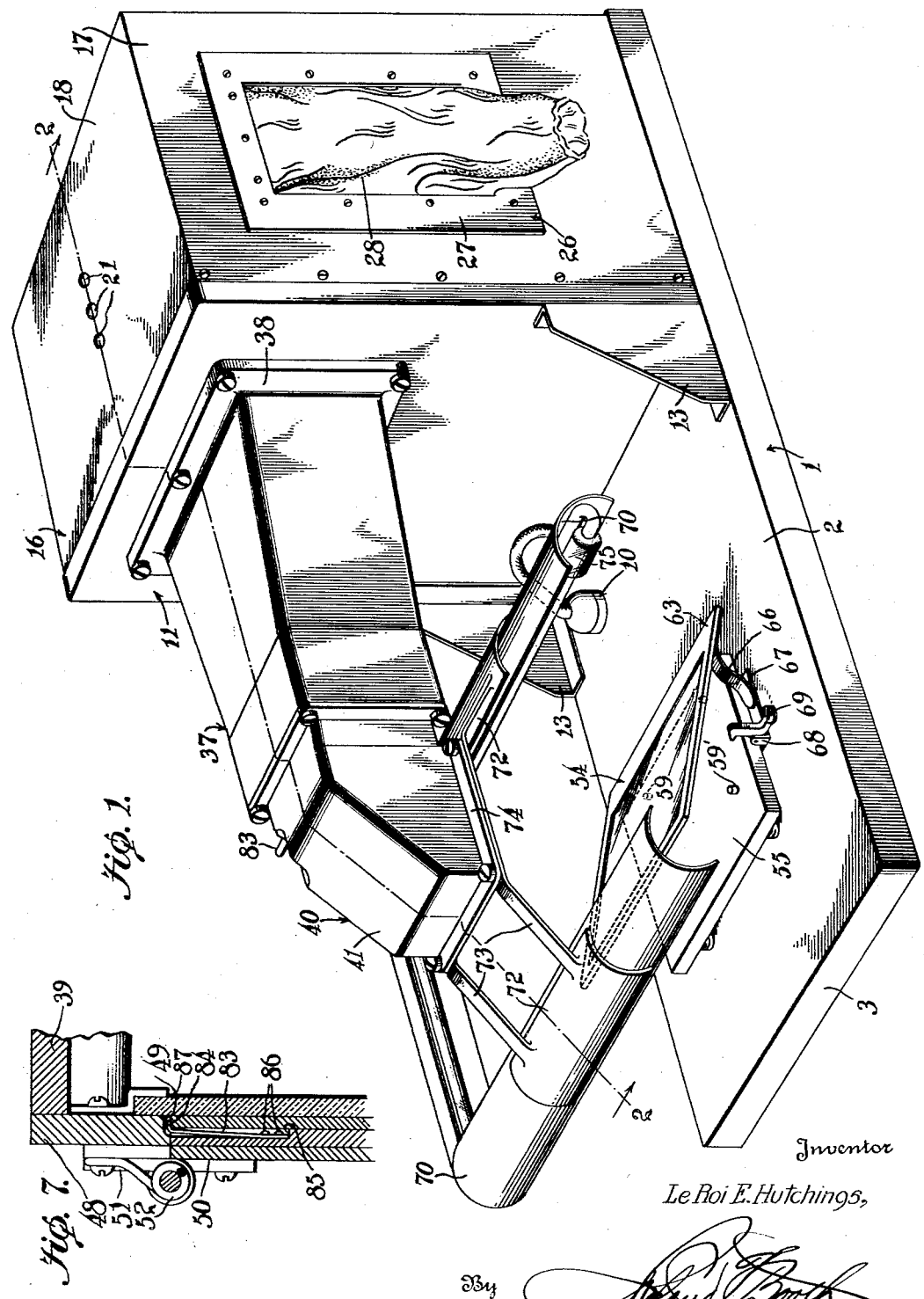
Inventor
Le Roi E. Hutchings,
By
Attorney

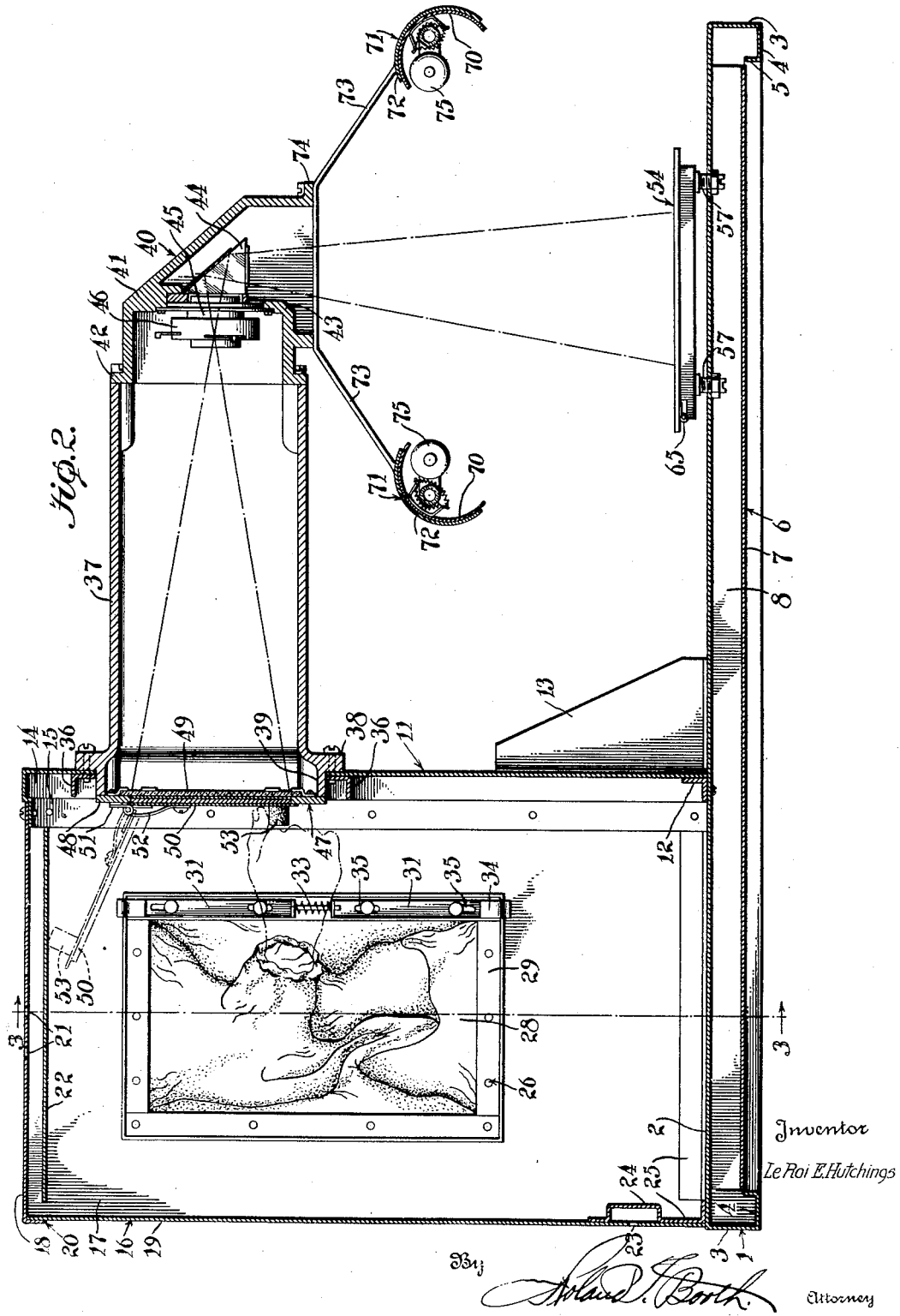

May 26, 1936.   LE ROI E. HUTCHINGS   2,042,005
CAMERA FOR DUPLICATING RECORD CARDS
Filed Sept. 9, 1933   3 Sheets-Sheet 3
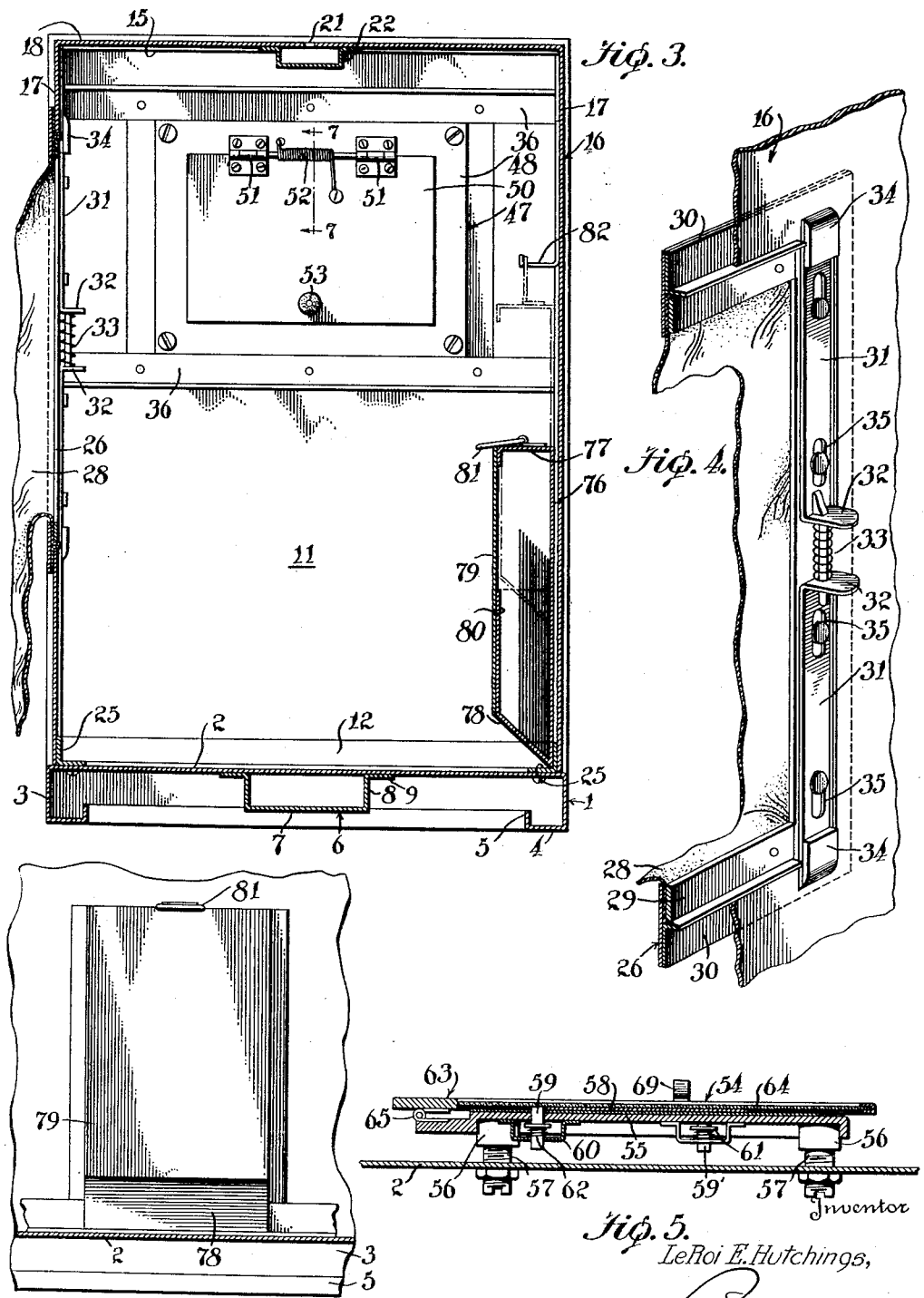

Patented May 26, 1936

2,042,005

UNITED STATES PATENT OFFICE 2,042,005

CAMERA FOR DUPLICATING RECORD CARDS

Le Roi E. Hutchings, Kenmore, N. Y., assignor to Remington Rand Inc., Buffalo, N. Y.

Application September 9, 1933, Serial No. 688,810

12 Claims. (Cl. 88—24)

This invention relates to improvements in photographing devices, particularly cameras for photographing records.

The invention comprehends the provision of a camera that is particularly adapted for economically producing accurate positive reading photographic duplicates of discrete record cards and sheets of uniform size for making duplicate discrete copies of uniform size.

This invention provides a camera so an operator can make duplicate copies of record cards on sensitized cards of a similar size by placing discrete record cards of uniform size in photographing position in the record card holder on the base of the camera with one hand and extend the other hand through the sleeve into the housing for taking a sensitized card out of the holder in the housing and placing it in the holding frame for photographing. The operator operates the shutter to take the picture with the first hand and then proceeds to photograph other record cards on other sensitized cards in the same way so that uniform sized positive reading duplicates are obtained one or more at a time in successive order as desired.

The invention comprehends the provision of a camera having a base, supporting plate and casing structure that cooperate to provide a substantially rigid base and housing structure for supporting a photographing mechanism above the base that will accurately photograph record cards carried by the base onto sensitized cards in the housing. The supporting plate of the camera carries a supporting and spacing tube construction carrying the photographing unit and the holding frame for sensitized cards and provides compensation for differences in focal lengths of the lenses used in the photographing unit of each camera.

The invention further comprehends the provision of a record card holder carried by the base that is adjustable vertically relative to the base toward and away from the photographing unit to compensate for variations in the structure and assembly of the supporting plate, base and casing structure, in order that record cards may be supported for photographing in the proper focus of the lens in the photographing unit. Suitable illuminating means is suspended from the photographing unit for illuminating cards carried by the base for photographing, this arrangement for illumination avoiding an obstruction over the base that would interfere with the insertion and removal of record cards into and out of photographing position. The housing of the camera has a flexible sleeve member carried by a hinged door that provides access for one hand of an operator through the sleeve to the interior of the housing for manipulating sensitized cards so that that they may be removed from a suitable container and placed in the holding frame for photographing in successive order. A container for sensitized cards in the housing is constructed to be light-tight in closed position so that when exposed cards are removed from the housing through the door opening, the sensitized cards that have not been used will be protected from exposure to light while the exposed cards will be placed in a suitable box before removal from the housing.

In the drawings:

Fig. 1 shows the camera made according to this invention in perspective.

Fig. 2 is a vertical longitudinal cross section taken substantially along lines 2—2 of Fig. 1.

Fig. 3 is a vertical transverse cross section taken substantially on line 3—3 of Fig. 2.

Fig. 4 is an enlarged fragmentary view showing the door and latch construction for the housing in perspective.

Fig. 5 is a cross section for illustrating structural features of the record card holder.

Fig. 6 is a view taken inside of the housing showing the sensitized card holder in elevation with adjacent portions of the housing and base shown in section and broken away.

Fig. 7 is an enlarged detail cross section taken on line 7—7 of Fig. 3 showing the ejector.

The camera has a base 1 formed of sheet metal. The sheet metal forming base 1 has a body portion 2 provided with depending marginal flanges 3 having inwardly turned portions 4 at the lower edges terminating in upwardly directed edge portions 5. The inwardly turned portions 4 are in spaced substantially parallel relation to body portion 2. The portions 3, 4 and 5 cooperate with body portion 2 to provide a substantially rigid base structure. The strength of the base is further increased by the longitudinal stiffening member 6 extending throughout the central portion of body portion 2 from end to end of the base. This stiffening member is provided with angular portions 7, 8 and 9 that form a channel member having the flanges 9 suitably welded or otherwise secured to body portion 2.

Web portion 7 is in spaced parallel relation to body portion 2 while web portions 8 are perpendicular thereto and join with opposite edges of portion 7, thereby adding substantial strength and distributing stress applied to the base substantially uniformly with the marginal flanges so that a rigid base construction is obtained for the camera. This base construction also provides a convenient means of housing the electrical wires that make the circuit connection with the illuminating unit. For this purpose a plug and socket connection indicated at 10, the plug being carried by the conductor on the illuminating unit and the socket by the base, is provided for detachably connecting the illuminating unit with the conductors housed in the base that have suitable connection with a current supply circuit.

A supporting plate 11 extends transversely across body portion 2 of base 1 and has an angle member 12 provided with one flange secured to the lower edge thereof and the other flange suitably secured to body portion 2. Supporting plate 11 extends substantially vertically from base 1 and it is rigidly supported in position by sheet metal angle brackets 13 secured to opposite side portions thereof and to opposite side portions of body portion 2 of base 1. The side and top edges of supporting plate 11 are provided with laterally extending marginal flanges 14 having free edge portions 15 offset inwardly to provide a seat around the sides and top of the supporting plate.

A casing 16 formed of sheet metal has side walls 17, top wall 18 and end wall 19. The side walls 17 and top wall 18 are formed from a single piece of sheet metal and are provided along one of their edges with laterally extending flanges as indicated at 20 in Fig. 2 for embracing the marginal portions of end wall 19 to which said end wall is welded to form an integral casing structure. Top wall 18 is formed with a series of openings 21 and a U-shaped cover member 22 extends over these openings and also a substantial distance beyond the openings to provide for ventilation of the housing formed by the casing, but so arranged that light is not admitted to the casing sufficiently to damage sensitized cards. At the lower end of end wall 19 there are formed a series of openings 23 covered by a similar U-shaped member 24 forming a cover for openings 23 also providing for ventilation and obstructing the entrance of light into the housing that would damage sensitized cards. With this ventilating arrangement air may enter openings 23 and exhaust through openings 21.

The free edges of sides 17 and top 18 of casing 16 are engaged in the seats formed by flange 15 of supporting plate 11 to which the casing is suitably secured. The lower edges of side walls 17 and end wall 19 are secured to the base 1 by any suitable means such as angles 25 having one flange suitably attached to body portion 2 of the base and the other flange attached to the marginal portion of sides 17 and end wall 19.

This construction of base 1, supporting plate 11 and casing 16 cooperates to form a rigid base and housing construction for the camera that provides a light-tight compartment within the housing in order that sensitized cards may be handled in the housing without exposure or damage by light.

To provide access to the housing, one of the walls 17 is formed with an opening as shown in Fig. 2, this opening being closed by a door 26. The door 26 comprises a rectangular frame of sheet metal indicated at 27 in Fig. 4, the center portion of the frame being open and supporting a flexible opaque sleeve 28 that has one end engaged with frame 27 around the inner marginal edge thereof and securely attached to frame 27 by means of a securing frame 29 of rectangular form. Bracket members 30 secured to frame 27 cooperate with frame 29 in securing the sleeve thereto and in providing a rigid door structure for the casing. This door 26 is hinged along the rear edge adjacent the end of the base as illustrated in Fig. 1 while the free edge of the door carries a pair of slidably mounted latch members 31 on the inside face of frame 29. The inner ends of these latch members are provided with handles 32 while a spring 33 serves to normally separate the latch members and project the ends 34 into latching engagement with the inner face of side wall 17 of the casing for locking the door in closed position so that it may be opened only from the inside. Latch members 31 are mounted on frame member 29 by means of pin and slot connections indicated by the numeral 35 in Fig. 4. The opposite end of sleeve 28 is formed with a hand opening to receive the hand of the operator and the end of the sleeve is provided with an elastic band so that the sleeve will fit tightly around the wrist or arm of the operator and prevent admission of light to the housing.

Supporting plate 11 is formed with an opening near the upper end and above and below the opening angle members 36 extend across the inner face of the supporting plate between the side edges. A supporting and spacing tube 37 is provided adjacent one end with an annular flange 38 engaged against the front face of supporting plate 11 and suitably secured thereto and to angle members 36. This provides a rigid support for tube 37 on supporting plate 11 with the tube projecting forwardly over base plate 1 in the manner illustrated in Figs. 1 and 2. Supporting tube 37 is provided with a compensating flange 39 that extends through the opening in supporting plate 11 into the housing formed by the cooperation of casing 16, supporting plate 11 and base 1. This is clearly illustrated in Fig. 2 and the purpose of the compensating extension or flange 39 will be hereinafter described.

The opposite end of supporting tube 37 carries the photographing unit 40, the casing 41 of which is provided with a flange on one end indicated at 42 that is suitably secured to the end of tube 37 as clearly illustrated in Fig. 1. The housing 41 is provided with inwardly extending flanges 43 that support a reflecting prism 44, and a lens structure 45 including a shutter construction 46. The illustration of the prism 44, lens structure 45 and shutter 46 are an illustration of these units in elevation, without illustrating the detailed features of construction because such details are of old and well known character in the art. As a result the disclosure particularly Fig. 2, illustrates these parts in elevation and their arrangement to each other together with their mounting, this being all that is deemed necessary for completely illustrating this photographing mechanism.

The photographing mechanism reverses the image on a record card through the use of the prism in order that the image photographed will be positive reading so that the record on the face of a record card can be directly photographed into a positive reading record on a duplicate card without first producing a negative. The lens carried in this photographing unit focuses the record card and the shutter mechanism controls the operation of the camera in the usual and well known manner.

The lens used in the photographing unit is mounted permanently in the lens unit so the camera is for the taking of pictures of fixed size. In using lenses in these cameras it has been found that in the manufacture of the lenses there is a slight variation in the focal length of each similar lens and that compensation has to be made, in each camera made according to the invention, for the difference in the focal length of the lens used. In the present camera this difference in focal length is compensated for by the compensating flange or extension 39 on the opposite end of tube 37, the focal length of the lens to be used in any one camera being determined in advance, and in the manufacture of the camera tubes 37 have the compensating extension 39 cut off to the proper length for proper compensation so that a sensitized card to be photographed can have its sensitized face supported for photographing in the focal plane of the lens.

The end of compensating extension 39 supports a holding frame generally indicated by numeral 47. This holding frame for sensitized cards has a rectangular frame 48 secured to the end of extension 39. The central portion of frame 48 is open and the forward face thereof supports a transparent glass plate 49 suitably secured in position to frame 48. The rear face of plate 49 is so arranged that it will be at the focal plane of the lens in photographing unit 40 as sensitized cards to be photographed are placed with their sensitized face against plate 49. These sensitized cards are held against the face of plate 49 in the opening in frame 48 by means of a hinged backing member 50. Backing member 50 is hinged along its upper edge to frame 48 by hinges 51 including suitable spring means 52 for moving backing member 50 upwardly out of frame 48 from the full line position shown in Fig. 2 to the position shown in dotted lines. A handle 53 is placed on the lower end of backing member 50 so that it may be manually operated and held in position within frame 48 for holding a sensitized card against the transparent plate member 49.

A suitable record card holder 54 is mounted on the end of the base opposite to the housing. This card holder includes a plate member 55 formed with bosses 56 to receive screw members 57 threaded into body portion 2 of base 1 for adjustably mounting plate member 55 in substantially parallel relation to body portion 2. A record card to be photographed is placed on plate member 55 and the plate member is adjusted so that the upper face of the record card indicated in Fig. 5 by numeral 58 is supported in the proper focal plane of photographing unit 40.

Plate member 55 is made adjustable due to variations in construction of the base member and supporting plate 11 together with its mounting of the supporting and spacing tube 37 and the photographing unit thereon. This adjustment of plate member 55 compensates for variations in construction in order that a card to be photographed can be supported in the focal plane of the lens.

The card 58 for photographing is held in proper position on plate member 55 by a pair of pins 59 slidably mounted in plate 55 and guide brackets 60 and arranged in alignment at the back of plate 55. Intermediate plate 55 and guide brackets 60 each pin 59 is provided with a collar 61. A coil spring 62 is mounted on each pin between the collar 61 and bracket 60 for normally projecting the pin 59 above the upper face of plate member 55. A card to be photographed is arranged on plate 55 so that one edge will engage pins 59 adjacent the rear edge of the card holder while one end of the card will engage pin 59' at one end of plate 55 and position the card so it will be accurately focused on the card in the holding frame. Pin 59' is constructed and mounted in the same manner as pins 59.

A record card to be photographed when mounted on the plate 55 is held in flat relation on the plate by means of a holding frame 63 of rectangular form having an open central portion carrying a transparent glass plate 64. Frame 63 is hinged at 65 to the rear edge of plate member 55 and is normally held in the raised position shown in Fig. 1 by means of leaf spring 66. One end of leaf spring 66 is secured to frame 63 and the opposite end slidably engages a flange 67 on one end of plate member 55.

Flange 67 is carried by a bracket member attached to plate member 55 formed with ears 68 as shown in Fig. 1 for pivotally mounting a spring pressed catch 69 operable to retain frame member 63 in lowered position as shown in Fig. 5 for holding a record card flat against the face of plate 55. Release of catch 69 releases frame member 63 and spring 66 will raise it into the position shown in Fig. 1. When frame 63 is moved to the lowered position for engagement by the catch and for the purpose of holding a record card flat on base 55, the glass plate 64 engages the upper ends of pins 59 and moves them downwardly through plate member 55 against the tension of springs 62. As a result, the pins hold the card in position against shifting and at the same time provide for the convenient manipulation of frame member 63 which forces the card into flat engagement with plate member 55, in which position it is retained by catch 69.

In order to properly illuminate the record card in card holder 54, a suitable illuminating unit is provided, including a reflector 70 attached to a supporting bracket 71 having a pair of plate portions 72 secured to the reflector and strap portions 73 joining said pair of plate portions 72 secured intermediate their ends to flange 74 on the lower end of housing 41 of photographing unit 40. The reflector 70 is of U-shaped construction as clearly illustrated in Fig. 1 and is mounted in a horizontal plane so as to provide portions on opposite sides of the photographing unit supported slightly below the lower end thereof, the reflector being of arcuate shape in cross section and arranged to direct light downwardly and inwardly onto card holder 54.

A suitable electric light producing device such as incandescent lamps or a tube, neon light, mercury vapor lamp or the like may be used, a tube being generally indicated diagrammatically by the numeral 75 supported by reflector 70 on the inner side thereof so that the light will be reflected on the card holder 54 and shielded from view in other directions. This electric lamp or lamps is connected to the plug 10 by suitable circuit connections for connection with a source of electrical energy for operation in a well known manner. It is to be understood that any suitable form or type of light may be used with reflector 70 and that the illustration thereof in the drawings and reference thereto in the description is for the purpose of example only, any suitable type of light being used that will provide the proper lighting of the record cards in the holder.

By suspending the lighting unit from lens unit 40, the base 1 is unobstructed with connections or supports on either of the sides or the front end, and as a result the base is clear for manipulation of the record card to be photographed by the camera or any other suitable material that is to be photographed.

Sensitized cards for use in taking pictures with this camera are housed in a container and supported by a suitable slide 76 mounted inside the housing and formed of sheet metal plate having the upper end extended laterally at 77 to provide a top for the slide, the free edge of the top 77 being turned downwardly, while an inclined bottom 78 extends laterally from the plate so as to hold a series of sensitized cards in stepped position in the slide with their edges offset. This slide is mounted in a suitable housing indicated by the numeral 79 formed of a U-shaped piece of sheet metal having the free ends extended laterally and secured to the side wall 17 opposite door 26.

This casing 79 is secured to side wall 17 so that the slide 76 is supported for vertical sliding movement therein. The bottom 78 of tray or slide 76 is formed at the opposite edge from the plate with a retaining wall 80 that extends for only a portion of its length opposite said plate so as to leave an opening through which the cards may be withdrawn from the slide for insertion into holding frame 47. When slide member 76 is in its lowered position as shown in Fig. 3, casing 79 entirely encloses the slide member in light-tight relation in the housing. When it is desired to use the cards in slide member 76, it is elevated through use of handle member 81 on flange 77 thereof, this member 81 including a looped wire member adapted for positioning over a supporting pin 82 mounted on the inside of wall 17 of the casing above the card holder a sufficient distance that the upper edges of the cards in the slide are obtainable through the open side of slide 76. By having the bottom of the slide member inclined sensitized cards can be easily removed one at a time when the slide member is supported on the pin 82 in its elevated position as shown in dotted lines in Fig. 3.

In order to prevent any difficulty in removing an exposed sensitized card from frame member 48, holding member 50 is provided with an ejector 83, (see Fig. 7), having a laterally extending end 84 to engage the edge of the card as member 50 is opened or raised so that the upper edge of the card will be moved out of the frame. The card will buckle slightly in this operation.

Ejector 83 is mounted in recess 85 in member 50 and secured at the end opposite end 84 to member 50 by screws, rivets or other suitable elements 86. Frame 48 is recessed at 87 to accommodate end 84.

In using the camera constructed as described above a box containing sensitized cards is placed in the housing through the door and the door is then closed. An operator then inserts one hand into the end of sleeve 28 and into the inside of the housing, opens the box and takes the sensitized cards out of the box and places them in slide 77 in the open position. After the supply of cards is placed in slide 77 and the illumination turned on in the light unit, the camera is ready for operation to make duplicates of record cards.

This camera is designed so that the size of the photograph taken and the size of the duplicate card will be substantially the same size as the record card from which the photograph is produced in order to make uniform sized copies of the record cards photographed. The camera is constructed so that in taking uniform sized photographic duplicates of record cards, the record matter on the cards will be reproduced and positioned on the photographic duplicates in the same relation it occurs on the original. The sensitized cards used with this camera have the entire face sensitized in order that the face of the record cards can be accurately focused onto the face of the sensitized cards to produce a uniform sized duplicate thereof. The compensation for the difference in the focal length of the lens used facilitates the attainment of this advantage. The operator with one hand in the housing through sleeve 28 inserts a sensitized card into holding frame 47 and against glass plate 49, then moves holding member 50 from the dotted line position of Fig. 2 to the full line position for holding the card flat against plate 49.

A record card to be photographed is inserted in card holder 54 in engagement with pins 59 in the manner above described and frame member 63 is then moved from the full line position of Fig. 1 down onto plate 55 until the catch 69 moves into operative position to hold the frame member and record card against plate 55. When this operation is complete the record card is then ready for photographing onto the sensitized card positioned in holding frame 47. This is accomplished by operating the push button 83 on lens unit 40 which operates the shutter mechanism 46 and exposes sensitized cards for taking the photograph of the record card in holder 54.

When this operation of the camera is completed the backing member 50 is released and the photographed card removed from holding frame 47 and placed in the bottom of the housing or any suitable container provided for the purpose within the housing.

After removing the sensitized card as above described, a second card can then be placed in holding frame 47 for taking another picture of the same or another card supported in card holder 54. When successive cards are to be photographed, the latch 69 is operated to release frame member 63 and the record cards on plate member 55 is removed and the next one inserted, the operation being repeated for as many cards and photographs thereof as are desired, one operator performing all of the operations necessary in taking the photographs of the cards. With the cards offset in the slide 76 as hereinbefore described, each card presents its edge offset from the edge of an adjacent card in order that one card can be conveniently removed at a time. After a series of cards have been photographed in the manner described above, they are collected together in the bottom of the housing and placed in a light-tight box or the like, and before removing the cards after they have been placed in the box, slide member 76 is moved into the full line position of Fig. 3 by releasing ring 81 from pin 82. The operator can then operate the latch members 31 on the door to open the door of the housing and remove the exposed cards so they may be taken to the development room and developed in the usual way, the development of the cards producing positive reading duplicate records of the original on uniform sized cards.

What is claimed is:

1. A camera of the class described, comprising a base, a transversely arranged substantially vertical supporting plate mounted on one end portion of said base, a sheet metal casing section having the free edges of the top side and end walls secured to the marginal portions of said supporting plate and base for cooperation therewith to provide a light-tight housing, one of said walls having an opening, a door having an opening hinged on said last-mentioned wall for closing the opening therein, an elongated flexible opaque sleeve mounted on the door over the opening therein and having a hand hole in the free end, latching means on the inside of said housing and door for retaining said door in closed position, a supporting tube having one end portion mounted on said supporting plate and projecting through an opening therein into said housing, a sensitized card holder on the end of said tube in said housing, said tube projecting over the end portion of said base opposite to said housing, a photographing unit mounted on the end of said tube opposite said housing for photographing the image of a card in a photographing position on said base plate under said unit, onto a sensitized card in said card holder, and a lamp carrying frame suspended from said photographing unit for illuminating a card to be photographed.

2. A camera for making photographic duplicates of cards, comprising a base, a supporting plate extending upwardly from an intermediate portion of said base, a supporting tube extending through an opening in said plate having a flange on one end portion securing the tube to said plate, a photographing unit on the other end of said tube, a holding frame for a sensitized card fixed on the end of said tube having the flange, said tube having its length fixed to equal the length of focus of the lens in said photographing unit whereby said holding frame will support a sensitized card in fixed position in focus with said lens, means on the base under said photographing unit for holding a card in position to be photographed, a casing cooperating with said base and supporting plate to provide a light-tight housing around said holding frame, and a flexible sleeve member secured over an opening in said casing to provide access for the arm of an operator to manipulate sensitized cards in said housing into and out of said frame for photographing cards held by said means.

3. A camera for making photographic duplicates of cards and the like, comprising a base, a supporting plate extending upwardly from an intermediate portion of said base, a supporting tube having one end portion mounted in said plate in spaced parallel relation above said base, said end portion projecting through an opening in said plate, a sensitized card holding frame mounted on said end of said tube having a frame member secured to the end of the tube and formed with an opening, a transparent plate on the frame extending over said opening and having one face thereof forming a focal plane for having the sensitized surface of an opaque paper card engaged therewith for photographing, a hinged backing member operable to hold said sensitized card against said transparent plate, a casing attached to said supporting and base plates and cooperating to form a light-tight housing about said holding frame, said casing having a flexible member provided with a hand hole to provide access for the hand and arm of an operator to manipulate said backing member and remove and place sensitized cards against said transparent plate, a photographing unit on the opposite end of said supporting tube having means for focusing and photographing a positive image of a record card positioned on said base plate under said unit onto the sensitized surface of a card held against said transparent plate, said supporting tube having a portion of one end removed to fix the length thereof to equal the focal length of the lens in said photographing unit.

4. A camera for directly making positive reading photographic duplicates of record cards and the like, comprising a base, a housing fixed on one end of the base, a supporting tube having one end mounted in said housing in spaced parallel relation above the base, a photographing unit mounted on the other end of said tube having photographing means for focusing the image of a record card supported thereunder on said base at a focal plane located near the first-named end of said tube, a compensating flange on the first-named end of said tube projecting into said housing having a variable but fixed length in different cameras, a holding frame mounted on the end of said flange for holding a sensitized card in said focal plane for receiving an image of the record card on the base, said compensating flange having its length fixed in each camera to support said holding frame in position to hold the sensitized face of a record card in said focal plane.

5. A camera for directly making positive reading photographic duplicates of record cards and the like, comprising a base, a housing fixed on one end of the base, a supporting and spacer member having one end portion secured to said housing, said member having a fixed distance between the portion secured to the housing and the opposite end thereof, a photographic unit on the last-mentioned end of said member, a compensating extension on the first-mentioned end of said spacer member extending into said housing, a sensitized card holding frame on the end of said compensating extension, said compensating extension having its length fixed in each camera, but being of different lengths in other similar cameras to compensate for differences in the focal length of lenses and to have a length to support a sensitized card in said holder in the focal plane of the lens in said photographing unit, a record card holder on said base under said photographing unit, and means attaching said holder to said base for vertical adjustment to a position for holding a record card in focus with said photographing unit for photographing said record card onto said sensitized card and compensating for variations in the mounting of said spacer tube and photographing unit.

6. A camera for directly making positive reading photographic duplicates of record cards and the like, comprising a base, a supporting plate mounted on an intermediate portion of said base in transverse upwardly extending relation, a casing having top, side and end walls attached at the free edges to said plate and one end portion of said base for cooperation therewith to provide a light-tight housing, a door for closing an opening in one of said walls, said door having an opening, a flexible sleeve carried by said door and normally closing said opening, said sleeve having a hand opening so an operator may insert a hand and arm for manipulating sensitized cards in said housing, a spacer tube mounted at one end on said supporting plate and having a compensating extension on said end projecting into said housing, a photographic unit on the other end of said tube, a sensitized card holding frame on the end of said compensating extension, said extension having a fixed length in each camera but being of different lengths in other cameras to compensate for variations in focal length of similar lenses contained in the photographing unit of each camera, said extension in each camera supporting said holding frame in position to hold a sensitized card in the focal plane of said photographing unit, a record card holder mounted on said base for vertical adjustment under said photographing unit to compensate for variations in mounting said photographing unit and holding a record card in photographing position, and means for illuminating said record card having brackets suspended from said photographing unit, a reflector suspended from said brackets, and artificial light producing means supported by said reflector.

7. A camera for directly making positive reading photographic duplicates of record cards and the like, comprising a base, a housing mounted on one end of the base, a supporting and spacing tube on the housing above and projecting over the base, a photographing unit on one end of said tube having a supporting flange, a pair of supporting straps secured at the central portions to said flange in spaced parallel relation, a reflector having a pair of spaced parallel portions secured at opposite sides of said photographing unit on the corresponding ends of said straps, illuminating means carried by said reflector, and means on the base for positioning a record card in focus with said photographing unit and lighted by said illuminating means, said base being free from obstructions beyond said housing under said supporting tube and reflector.

8. A camera of the class described, comprising a base, a supporting plate mounted on an intermediate portion thereof in transverse upwardly extending relation and having the side and top edges formed to provide a laterally extending flange, upwardly extending flanges on one end of the base and the side edges between said end and said plate, the flange on said plate extending toward the last-mentioned end of said base, a casing formed of sheet metal to provide top, side and end walls, the free edges of the top and portions of said side walls being secured in overlapping relation to the flange on said supporting plate, the remaining free edges of said side walls and the free edge of said end wall being secured to the flanges on said base, said casing, base and plate cooperating to provide a light-tight housing, a supporting tube mounted on said plate and projecting above said base away from said housing, a holding frame for sensitized cards on the end of said tube adjacent said plate within the housing, a photographing unit on the other end of said tube operable to photograph a record card supported on said base plate under said unit onto a sensitized card in said frame, and means on said casing providing access to the inside of the housing for manipulating sensitized cards therein.

9. A camera of the class described comprising a base, a supporting plate mounted on an intermediate portion thereof in transverse upwardly extending relation and having laterally extending flanges on the side and top edges having the free edges of said flanges offset to provide a seat and reinforce said plate, a sheet metal casing formed of top, side and end walls, the top and side walls having free edges engaged in said seat and secured to said plate, the free bottom edges of the side and end walls engaging and being secured to said base, said base and casing cooperating to form a housing, flexible means having a hand opening providing access to the inside of said housing for the hand of an operator, and photographing means carried by said plate extending over said base for focusing the image of a record card on the base plate onto a sensitized card in the housing at the focal plane of said photographing unit, said housing providing for the manipulation of sensitized cards for photographing.

10. A camera of the class described comprising a base, a supporting plate formed of sheet metal having laterally extending edge flanges, said plate having an opening, angle members extending over the face of said plate on opposite sides of said opening having web portions perpendicular to said plate and cooperating to make said plate rigid, a casing secured at the edges to said edge flanges on the plate and to said base for cooperation to form a housing, a supporting tube having a flange on one end secured to said supporting plate and angle members and extending over said opening, a compensating flange on said tube extending through the opening in said plate into said housing, a holding member for sensitized cards on the end of said compensating extension, photographing means on the other end of said supporting tube for photographing a record card carried by said base, and means providing for access of the hand and arm of an operator to the inside of said housing for manipulating sensitized cards therein.

11. A camera for directly making positive reading photographic duplicates of record cards and the like, comprising a base, a housing on one end of said base, photographic means carried by said housing, a holding frame for a sensitized card in said housing for cooperating with the photographing means, means providing access to the inside of said housing for the hand of an operator, a sensitized card holder in said housing having a rectangular open ended sheet metal casing, a slide member of sheet metal in said casing having an inclined bottom wall and an open side portion, said slide member holding sensitized cards in offset relation, said card holder being light-tight in closed position, and cooperating means in the housing and on said slide member for suspending said slide member in open position for successive removal of sensitized cards by an operator and the positioning thereof in said holding frame for photographing, the operator manipulating said sensitized cards with one hand extended into said housing through said means.

12. A camera comprising a base formed of a sheet metal body portion having depending marginal flanges formed with inturned lower edges in spaced relation to said body portion, a stiffening member extending longitudinally of said body portion having web portions in perpendicular and spaced parallel relation to said body portion, a supporting plate of sheet metal having marginal flanges extending transversely and upwardly from an intermediate portion of said base, a casing of sheet metal secured to the flanges of said plate and one end of said base, said base, stiffening member, supporting plate and casing cooperating to provide a substantially rigid base and housing structure for said camera, photographing means on the housing for photographing cards supported on the end of the base opposite said housing, a holding frame in said housing for holding sensitized cards in the focal plane of said photographing means, and means providing access to the inside of said housing for the hand of an operator to manipulate sensitized cards therein into and out of said holding frame.

LE ROI E. HUTCHINGS.